United States Patent Office 3,442,738
Patented May 6, 1969

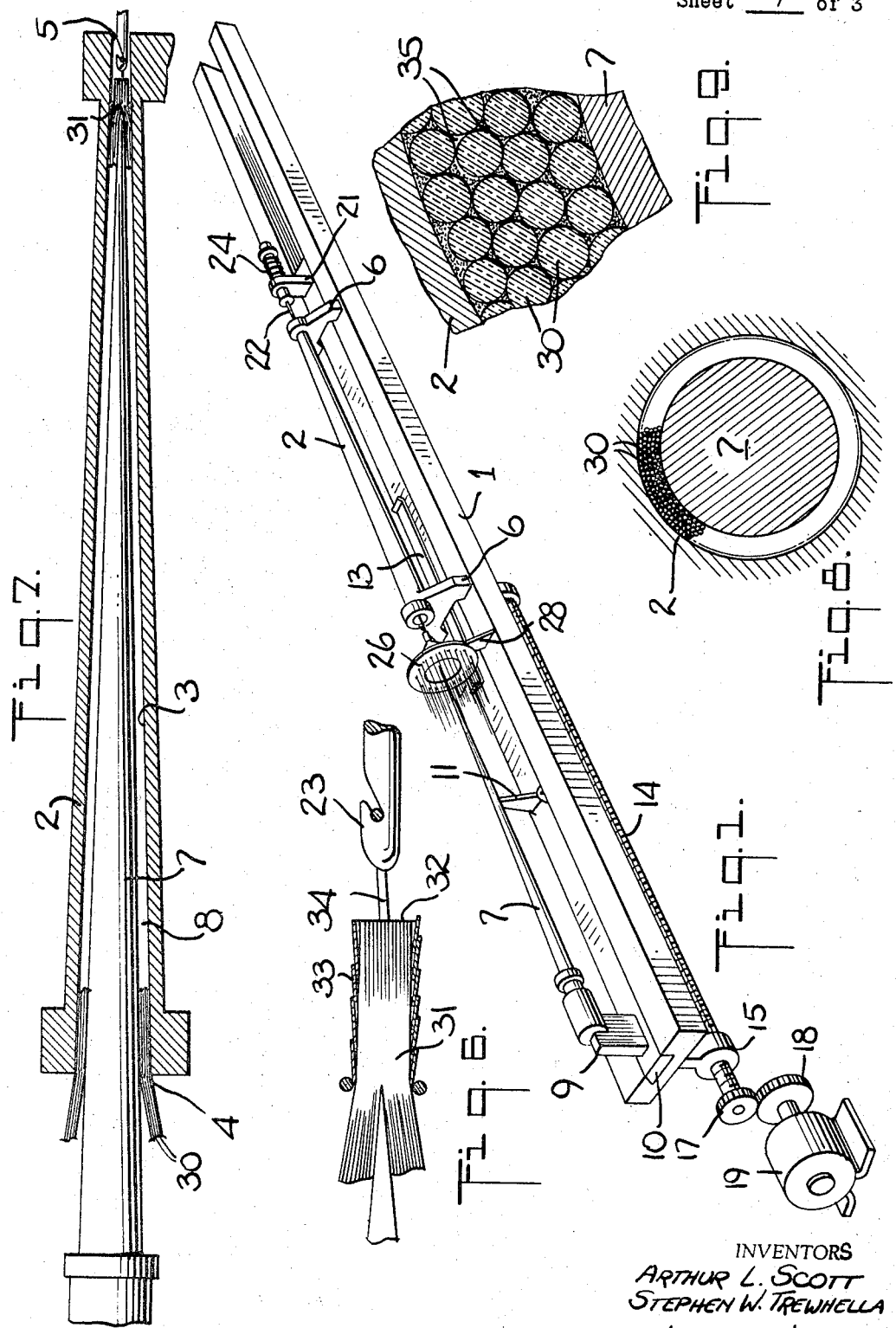

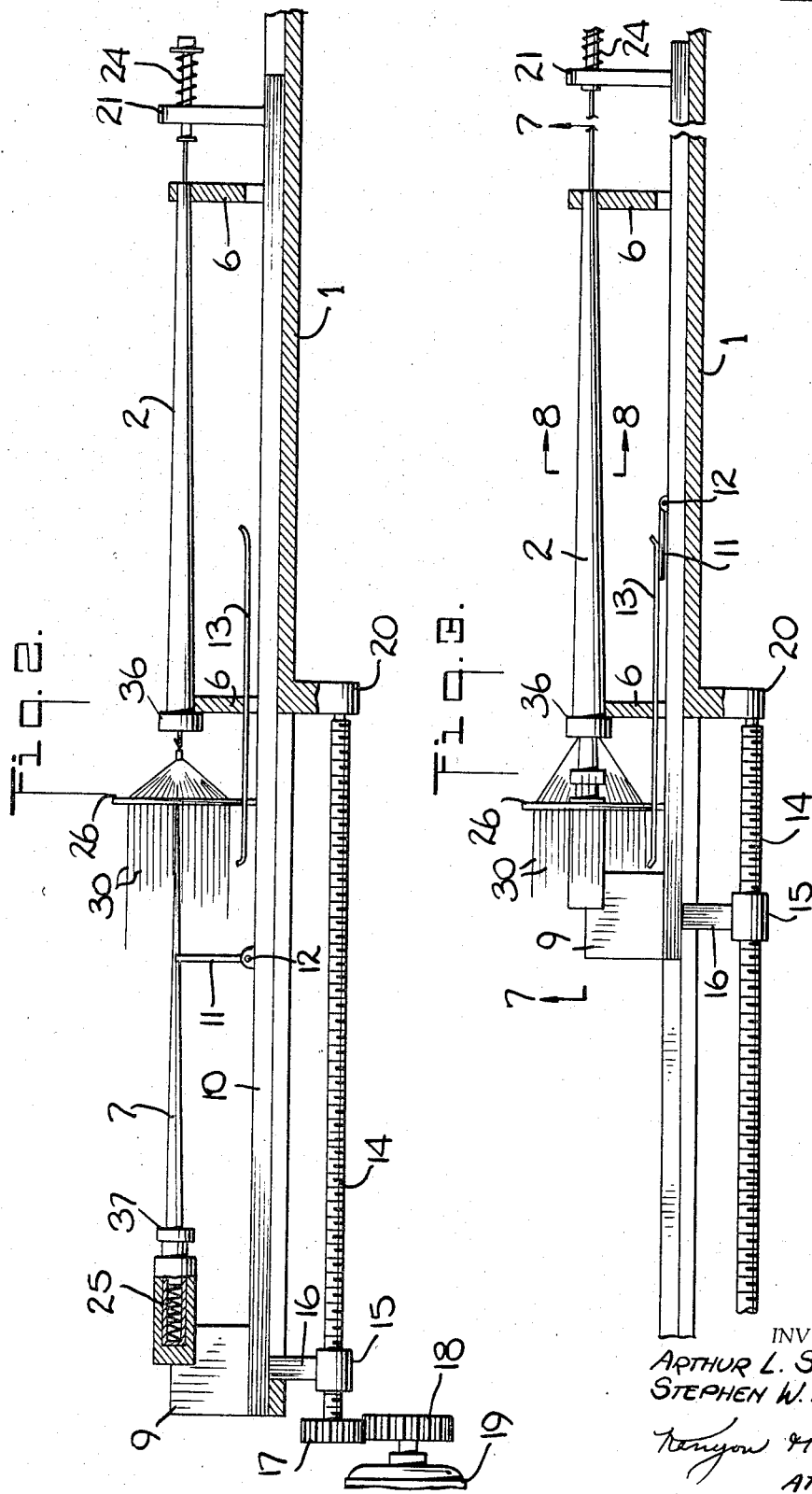

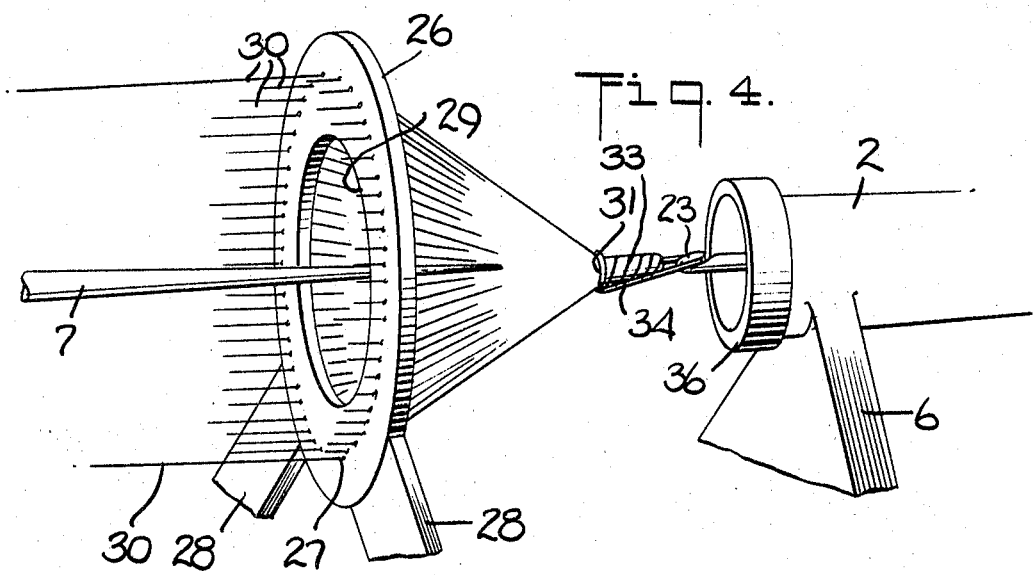
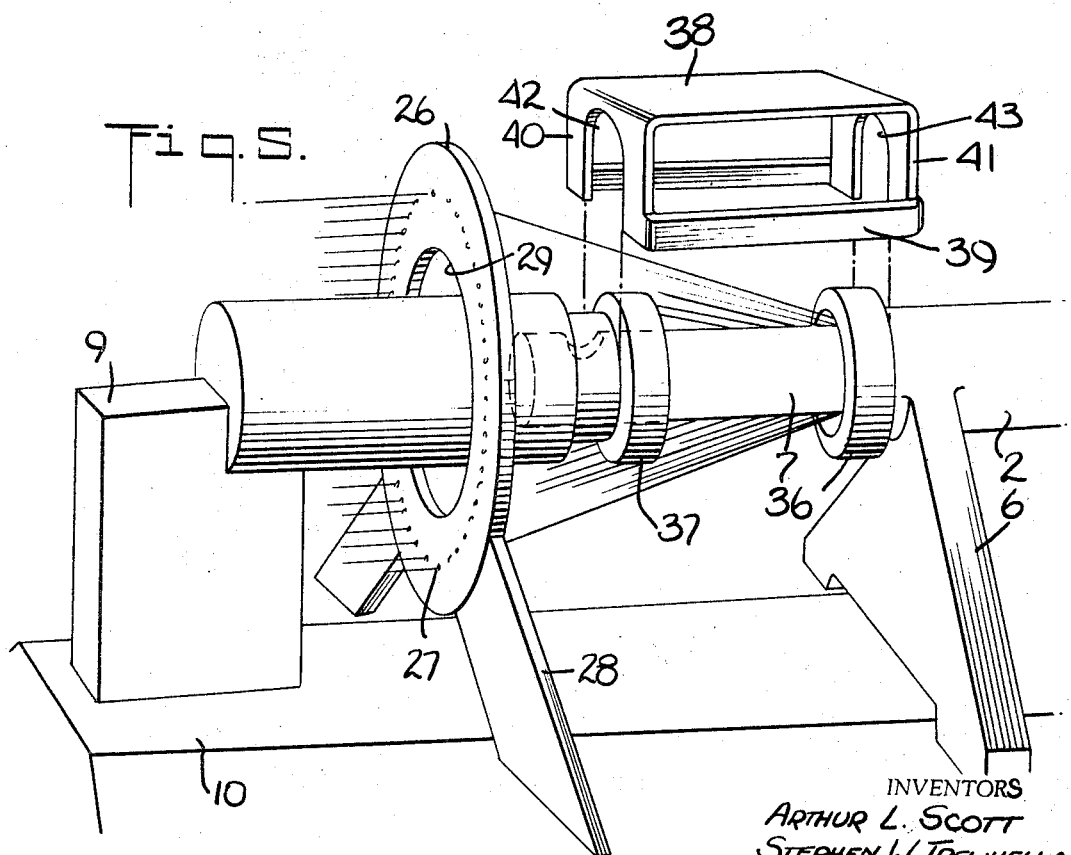

3,442,738
METHOD AND APPARATUS FOR MAKING FIBER GLASS SHAFTS
Arthur L. Scott and Stephen W. Trewhella, Columbia, S.C., assignors to Columbia Products Company, Columbia, S.C., a corporation of South Carolina
Filed Feb. 26, 1965, Ser. No. 435,473
Int. Cl. B65h *81/00*
U.S. Cl. 156—161          10 Claims

ABSTRACT OF THE DISCLOSURE

A glass fiber shaft of high modulus of elasticity ranging from 6.2 to $8.3 \times 10^6$ p.s.i. is obtained by confining the glass fibers and bonding resin between a tapered mandrel and tapered mold cavity. The mandrel is moved longitudinally into the cavity to exert a large compressive force on the fibers and resin to eliminate any voids and to fully adhere the fibers to each other. The fiber content is maintained between 70% to 90% of the total volume of the shaft.

---

This invention relates to fiber glass shafts having a high modulus of elasticity and the method of making such shafts.

Heretofore, it has been common practice to make shafts or rods of fiber glass suitable for use, among other things, for fishing rods and golf shafts in which a plurality of parallel glass fibers, each coated with a suitable resin and extending axially of the shaft or rod, are compacted together into the form desired, after which the resin is set to form the complete shaft or rod.

It has been recognized that glass fibers are particularly useful in making such rods or shafts because of their high tensile strength, ability to withstand permanent deformation and other properties, all of which contribute to quick recovery and other desirable characteristics in the completed shaft. Heretofore, however, it has not been possible to achieve a satisfactory product with a modulus greater than about $6.2 \times 10^6$ p.s.i.

It now appears that it is possible to produce fiber glass shafts or rods having a higher modulus of elasticity by following our new and improved method which involves use of special molds and manipulations which result in a fiber glass rod or shaft having a modulus of elasticity running up to approximately $8.3 \times 10^6$ p.s.i.

In carrying out the new method, a suitable bonding resin which may be thermoplastic or thermosetting is applied to a plurality of glass fibers. These are disposed in straight parallel relationship to one another with the adjacent fibers in contact throughout their length. The fibers thus assembled are placed in a suitable rigid mold lying axially of an elongated cavity.

In the preferred form of the invention, the volume of the glass fibers is such that they fill from 70–75% of the cavity of the mold and the amount of resin employed is enough to fill the balance of the cavity. Pressure is applied in the mold to assure even distribution of the resin along the fibers to fill all voids between them and to bring the fibers into close intimate contact, thus providing a rod or shaft in which the glass fiber content is maximum and the resin content is minimum for the volume of the shaft. The resin is uniformly distributed and the glass fibers are secured to one another to the maximum possible extent throughout the entire shaft without any voids or portions where there is an inadequate supply of resin.

In the preferred form of the invention, the mold is a two-piece mold comprising a hollow outer rigid member having a tapered elongated cavity and an inner solid tapered mandrel smaller than the cavity and adapted to be positioned co-axially of the tapered cavity so as to leave an annular mold cavity in which the glass fibers and resin are disposed.

The rigid outer member is open at both ends to facilitate the introduction of the glass fibers into the cavity and the mandrel is movable axially of the cavity to facilitate introduction of the fibers into the cavity of the mold and the application of pressure to the fibers after their introduction into the cavity.

In carrying out the invention, the fibers are first coated with resin which may be any of the suitable thermoplastic or thermosetting resins normally employed in making fiber glass shafts or rods. They are disposed uniformly on the surface of the mandrel and are simultaneously pulled into the cavity of the rigid mold member while the mandrel is simultaneously advanced into the cavity.

This is accomplished by pulling the glass fibers into the cavity while simultaneously advancing the mandrel at the same rate. Suitable means extending through the tapered cavity serve to pull the fibers.

The size of the tapered cavity and the size of the mandrel are so proportioned and shaped that at any pont along the length of the mold, when the mandrel is in position, the fibers will occupy from 70–85% of the space.

By means of this procedure, all of the fibers are maintained straight and parallel to one another and they remain in this straight parallel position when pressure is applied so that in the final product the fibers all remain in straight essentially parallel condition and the walls of the finished product are uniform in thickness at any cross section.

Means are provided after the fibers and mandrel are in position and pressure is applied to maintain the mandrel fibers and mold in this position while maintaining the pressure. Then, if the resin is a thermosetting resin, heat is applied. If it is a thermoplastic resin, the mold is cooled until the resin has set.

For the purpose of illustrating the invention, there are shown in the accompanying drawings apparatus which is at present preferred and provides desirable and satisfactory results. It will be understood, however, that this apparatus may be varied and that the invention is not limited to the specific arrangements shown and described.

In the drawings,

FIG. 1 is a perspective view of apparatus suitable for carrying out the invention.

FIG. 2 is a detailed sectional view through such apparatus.

FIG. 3 is a similar view showing the apparatus when the fibers and mandrel have been moved into position to mold the rod.

FIG. 4 is a detailed view showing apparatus for and the method of pulling the fibers into the mold.

FIG. 5 is a detailed view showing the same apparatus of the machine with the mandrel in place and with pressure applied, showing also means for maintaining the pressure during the curing or setting operation.

FIG. 6 is a detailed sectional view showing the method of securing the fibers for pulling into the mold.

FIG. 7 is a detailed sectional view taken on the line 7—7 of FIG. 3.

FIG. 8 is a detailed sectional view taken on the line 8—8 of FIG. 3.

FIG. 9 is an enlargement of a portion of FIG. 8.

The apparatus for carrying out this invention consists of a base 1 on which is supported a rigid hollow mold 2 having a tapered cavity 3 therein which is open at the large end as indicated at 4, and at the small end as indicated at 5. This mold may be formed of any suitable metal which will give the desired rigidity. It is provided with supports 6 to support it on the base and anchor it there for the making of the rods as described later.

A suitable tapered mandrel 7 is provided as a portion of the mold. It is adapted to be moved longitudinally of the member 2 and axially thereof to form a mold cavity 8 which is annular in cross section and into which the fiber glass is introduced for forming the rod.

Means are provided to support the mandrel on the base 1 in line with the axis of the mold member 2 and to advance it into the mold. They consist of a support 9 mounted on a slide 10 which also carries a collapsible support 11 which is hinged at 12 for engagement with the member 13 which folds the support 11 down on to the slide 10 as it advances and after the mandrel has been introduced into the mold member 2.

Means are provided for advancing the slide 10 and the mandrel 7 towards the mold 2. These consist of a screw 14 engaging in a nut 15, secured to the slide 10 by the member 16. The screw 14 is provided with a gear 17 meshing with a gear 18 driven by a suitable motor 19.

The ends of the screw are supported in suitable bearings. One is shown at 20 and the other, which is conventional, is not shown.

At the end of the slide 10, opposite that which carries the mandrel supporting member 9, is a member 21 to which is secured a needle or cable 22 which extends through the small opening indicated at 5 in the cavity 3 of the mold 2. This needle or cable terminates in a hooked end 23 to which the glass fibers are secured. It is long enough to extend through the cavity 3 of the mold 2 for attachment.

Spring means 24 are provided to resiliently hold the needle 22 and spring means 25 are provided at the mandrel holding member 9 to resiliently force the mandrel into position, as will be described later.

A distributor ring 26 provided with a plurality of spaced annularly disposed apertures is mounted by legs 28 on the frame 1 adjacent the end of the mold 2. It is disposed co-axially with the mandrel which passes through the central opening 29.

The fiber glass to be formed into the rod is distributed by the distributor ring 26. Filaments or slivers of the fiber glass indicated at 30 are threaded through the apertures 27 of this ring and are brought together at 31 at a point co-axially disposed with respect to the mandrel and the mold member 2.

Ends 32 of the fibers, as shown in FIG. 6, are brought together and bound with a tape 33, such as a cellophane tape, to which is attached a pull loop 34. The glass fibers thus bunched and bound together are secured to the hook 23 when the apparatus is in the position shown in FIG. 2 preparatory to drawing the glass fibers into the mold member 2.

Each thread or sliver 30 of glass is supplied from a reel or other source of supply which is not shown and the supply means is so arranged that as the needle and its hook 23 move to the right, as shown in FIG. 2, the threads or slivers 30 are all pulled under tension keeping them all straight, in general parallel relation around the mandrel 7 as it advances into the mold 2.

The threads or slivers 30 are compacted as they enter the mold 2 as is best seen in FIG. 7. They are evenly distributed around the mandrel and form a uniform layer thereon. Since the threads are pulled under tension as the mandrel advances, the threads or slivers are brought into close touching relationship with one another and remain parallel until the apparatus has moved into the position shown in FIG. 3.

When the position shown in FIG. 3 is reached, the fibers are compacted and pressed together due to the forcing of the mandrel into the mold cavity while the pull exerted keeps them properly positioned.

In the preferred form of the invention, the springs 24 and 25 are of such strength that one is assured of compressing the fibers so that substantially all of the voids between them are eliminated and so that the resin is uniformly distributed throughout the length of the rod making it effective as a bonding agent from one end to the other of each thread or sliver.

The taper of the cavity 3 and of the mandrel 7 is such that the cross sectional area of the cavity defined by the mandrel and cavity 3 is uniform from end to end when the mandrel is fully inserted as shown in FIG. 7. This assures uniform compacting or pressure on the fibers and resin throughout the length of the rod. With the special form of mold used, extremely high molding pressures are applied to the fibers and resin to squeeze out excess resin and eliminate voids and bubbles. The average golf shaft has a taper of about .070 inch in 12 inches thus the molding pressure is about 170 times the axial pressure exerted to force the mandrel into the tapered mold.

In carrying out the preferred form of the process, the volume of the fibers is such that when pressure is applied axially on the mandrel into the tapered cavity, the fibers occupy 70–75% of the space and the remainder is filled by resin. This is shown in FIGS. 8 and 9 where the threads or slivers 30 are shown in closely touching relationship. The resin indicated at 35 fills all of the voids and provides a thin, but effective adhesive layer joining the filaments or slivers 30 each to the next adjacent filament or sliver throughout its entire length. This is a condition which has not heretofore been achieved in a fiber glass rod and one which results in the production of a rod having a modulus of elasticity from $7.3 \times 10^6$ p.s.i. for 30% resin content, up to $8.3 \times 10^6$ p.s.i for 25% resin content.

If the volume of glass fibers is 66%, the modulus will be $6.8 \times 10^6$ which is considerable improvement over anything heretofore achieved. It is possible, however, with fibers 82% by volume to have a modulus of $8.6 \times 10^6$.

The invention is useful in the range from 70–90% of fibers, with the preferred form as indicated above.

In the preferred form of the invention, nothing intervenes between the parallel glass fibers during the process or in the finished product which makes this possible.

Should it be desired, an internal reinforcement could be provided consisting in slivers wound spirally around the mandrel prior to the application of the longitudinal extending fibers to the mandrel. Material advantage is obtained from the use of the invention even if intermediate spirally wound layers of glass fibers are employed since desirable compaction is obtained which would not be obtained if one attempted to achieve the results of the invention with woven cloth having a relatively high percentage of threads running in each direction.

After the fibers and mandrel have been moved into the position shown in FIGS. 3 and 5, the pressure may be maintained by a clamping mechanism such as is shown in FIG. 5. In this arrangement, the end of the mold 2 is provided with an annular raised ring 36 while the mandrel is provided with a similar ring 37. A holding or clamping means 38 is provided consisting of a central portion 39 and end portions 40 and 41 each of which is notched at 42 and 43 respectively to fit over the mandrel and mold 2 to engage the rings 36 and 37 and maintain them in pressure applying or compacting position.

After the fibers have been brought into the mold and compacted, the resin may be set in any suitable manner either by heating or cooling, depending on the resin.

It will be appreciated that it is possible to apply to the fibers the exact amount of resin desired to completely fill the voids. In such a case, the resin will, by the compacting, be evenly distributed into all voids. An excess of resin can be applied with recognition of the fact that on compacting the excess resin will be forced from the mold, thus providing essentially the same result.

In describing the invention above, it has been stated that resin is applied to the fibers prior to their introduction into the mold. It is contemplated, however, that the fibers may be introduced into the mold and that the resin may be introduced thereafter either by vacuum or pressure equipment in which case the fibers are all collected and the voids are all filled prior to the bonding.

The finished product is a rod having a high modulus of elasticity with the glass fibers all disposed parallel to one another each in contact with the next adjacent fiber and bonded thereto. The fibers will be closely disposed and there will be an absence of voids or portions poor in resin. The resin film will be thin but continuous.

The present invention may be embodied in other forms without departing from the spirit or essential attributes. It is, therefore, desired that the present embodiments be considered in all respects as illustrative and not restrictive, reference being had to the appended claims rather than to the foregoing description to indicate the scope of the invention.

We claim:

1. The method of producing fiber glass shafts having a high modulus of elasticity comprising applying a resin for bonding glass fibers together to a plurality of glass fibers, disposing said fibers uniformly and in straight parallel relationship with one another with adjacent fibers in contact throughout their length on a tapered mandrel, maintaining said fibers in said uniformly distributed straight parallel relationship and compacting them and closing voids therebetween and uniformly distributing the resin among them by introducing said mandrel and fibers into a hollow tapered mold cavity, tapered to fit over said tapered mandrel and fibers and provide spacing between said mandrel and cavity of uniform cross sectional area throughout the length of said mold cavity and mandrel when the mandrel is fully inserted in said cavity and pressing said mandrel into said cavity and maintaining pressure while setting said resin.

2. The method of producing fiber glass shafts having a high modulus of elasticity comprising applying a resin for bonding glass fibers together to a plurality of glass fibers, disposing said fibers uniformly and in straight parallel relationship with one another with adjacent fibers in contact throughout their length on a tapered mandrel, maintaining said fibers in said uniformly distributed straight parallel relationship and compacting them and closing voids therebetween and uniformly distributing the resin among them by introducing said mandrel and fibers into a hollow tapered mold cavity, tapered to fit over said tapered mandrel and fibers and pressing said mandrel into said cavity and maintaining pressure while setting said resin.

3. The method of producing fiber glass shafts having a high modulus of elasticity comprising applying a resin for bonding glass fibers together to a plurality of glass fibers disposing said fibers uniformly and in straight parallel relationship with one another with adjacent fibers in contact throughout their length in the cavity of a two-piece mold comprising an inner tapered mandrel and an outer rigid tapered member in which the mandrel is axially disposed free to move axially and to form an annular cavity, the fibers being of a volume to fill 70–75% of said cavity and the resin being of a volume to fill the balance of said cavity maintaining said fibers in contact and in parallel relationship and applying axial pressure in a direction to tend to force said mandrel into said mold and thereby apply pressure to said fibers to press them together and to uniformly distribute said resin to fill voids between said fibers and while maintaining said pressure setting said resin.

4. The method of producing fiber glass shafts having a high modulus of elasticity comprising applying a resin for bonding glass fibers together to a plurality of glass fibers disposing said fibers uniformly and in straight parallel relationship with one another with adjacent fibers in contact throughout their length in the cavity of a two-piece mold comprising an inner tapered mandrel and an outer rigid tapered member in which the mandrel is axially disposed free to move axially and to form an annular cavity, maintaining said fibers in contact and in parallel relationship and applying axial pressure in a direction to tend to force said mandrel into said mold and thereby apply pressure to said fibers to press them together and to uniformly distribute said resin to fill voids between said fibers and while maintaining said pressure setting said resin.

5. The method of producing fiber glass shafts having a high modulus of elasticity comprising applying a resin for bonding glass fibers together to a plurality of glass fibers, disposing said fibers in straight parallel relationship with adjacent fibers in contact with one another throughout their length drawing said fibers into a rigid hollow mold while maintaining their parallel relationship and contact between fibers, said fibers being of a volume to fill 70–75% of said mold and the resin being of a volume to fill the balance of said mold, applying pressure to force said fibers into close contiguous relationship and to distribute said resin so as to completely and uniformly fill the voids between fibers and setting said resin while maintaining said pressure.

6. Apparatus for producing fiber glass shafts comprising an outer hollow rigid mold member having an axially extending tapered cavity open at both ends, a tapered mandrel adapted to be disposed co-axially in said tapered cavity and spaced from the walls thereof to provide an annular mold cavity for the reception of fiber glass and bonding resin, said mandrel and tapered cavity being proportioned to provide a space of uniform cross sectional area therebetween when the mandrel is inserted into said tapered cavity, mandrel supporting means for supporting said mandrel on the axis of said tapered cavity and movable to advance said mandrel into said tapered cavity, distributing means for distributing glass fibers uniformly longitudinally of and on the surface of said mandrel and means extending through and movable longitudinally of said tapered cavity for engaging and pulling glass fibers from said distributing means through said cavity, means for tensioning said fibers to maintain them straight on said mandrel, and means for simultaneously moving said pulling means and said mandrel supporting means to advance glass fibers and the mandrel simultaneously into said tapered cavity, and means for pressing said mandrel and mold member together longitudinally to compact said glass fibers and close voids therebetween.

7. Apparatus for producing fiber glass shafts comprising an outer hollow rigid mold member having an axially extending tapered cavity open at both ends, a tapered mandrel adapted to be disposed co-axially in said tapered cavity and spaced from the walls thereof to provide an annular mold cavity for the reception of fiber glass and bonding resin, mandrel supporting means for supporting said mandrel on the axis of said tapered cavity and movable to advance said mandrel into said tapered cavity, distributing means for distributing glass fibers uniformly longitudinally of and on the surface of said mandrel and means extending through and movable longitudinally of said tapered cavity for engaging and pulling glass fibers from said distributing means through said cavity, means for tensioning said fibers to maintain them straight on said mandrel, and means for simultaneously moving said pulling means and said mandrel supporting means to advance glass fibers and the mandrel simultaneously into said tapered cavity, and means for pressing said mandrel and mold member together longitudinally to compact said glass fibers and close voids therebetween.

8. Apparatus for producing fiber glass shafts comprising an outer hollow rigid mold member having an axially extending tapered cavity open at both ends, a tapered mandrel adapted to be disposed co-axially in said tapered cavity and spaced from the walls thereof to provide an annular mold cavity for the reception of fiber glass and bonding resin, mandrel supporting means for supporting said mandrel on the axis of said tapered cavity and movable to advance said mandrel into said tapered cavity, distributing means for distributing glass fibers uniformly longitudinally of and on the surface of said mandrel and means extending through and movable longitudinally of said tapered cavity for engaging and pulling glass fibers from said distributing means through said cavity, means for simultaneously moving said pulling means and said mandrel supporting means to advance glass fibers and the mandrel simultaneously into said tapered cavity, and means for pressing said mandrel and mold member together longitudinally to compact said glass fibers and close voids therebetween.

9. Apparatus for producing fiber glass shafts comprising an outer hollow rigid mold member having an axially extending tapered cavity open at both ends, a tapered mandrel adapted to be disposed co-axially in said tapered cavity and spaced from the walls thereof to provide an annular mold cavity for the reception of fiber glass and bonding resin, said mandrel and tapered cavity being proportioned to provide a space of uniform cross sectional area therebetween when the mandrel is inserted into said tapered cavity, mandrel supporting means for supporting said mandrel on the axis of said tapered cavity and movable to advance said mandrel into said tapered cavity, distributing means for distributing glass fibers uniformly longitudinally of and on the surface of said mandrel and means extending through and movable longitudinally of said tapered cavity for engaging and pulling glass fibers from said distributing means through said cavity, means for tensioning said fibers to maintain them straight on said mandrel, and means for simultaneously moving said pulling means and said mandrel supporting means to advance glass fibers and the mandrel simultaneously into said tapered cavity.

10. Apparatus for producing fiber glass shafts comprising an outer hollow rigid mold member having an axially extending tapered cavity open at both ends, a tapered mandrel adapted to be disposed co-axially in said tapered cavity and spaced from the walls thereof to provide an annular mold cavity for the reception of fiber glass and bonding resin, mandrel supporting means for supporting said mandrel on the axis of said tapered cavity and movable to advance said mandrel into said tapered cavity, distributing means for distributing glass fibers uniformly longitudinally of and on the surface of said mandrel and means extending through and movable longitudinally of said tapered cavity for engaging and pulling glass fibers from said distributing means through said cavity, means for tensioning said fibers to maintain them straight on said mandrel, and means for simultaneously moving said pulling means and said mandrel supporting means to advance glass fibers and the mandrel simultaneously into said tapered cavity.

References Cited

UNITED STATES PATENTS

| | | | |
|---|---|---|---|
| 2,694,661 | 11/1954 | Meyer | 156—180 XR |
| 3,127,910 | 4/1964 | Scott | 156—180 XR |
| 2,721,820 | 10/1955 | Von Reis et al. | 156—441 XR |
| 2,741,294 | 4/1956 | Pancherz | 156—180 |
| 3,033,729 | 5/1962 | Shobert | 156—161 XR |

PHILIP DIER, *Primary Examiner.*

U.S. Cl. X.R.

43—18; 138—145; 156—180, 189, 433, 441; 161—172